(12) United States Patent
Imaizumi et al.

(10) Patent No.: US 8,390,849 B2
(45) Date of Patent: Mar. 5, 2013

(54) IMAGE FORMING APPARATUS OF EFFICIENTLY STORING INFORMATION RELATING TO CLIENT APPARATUSES IN NETWORK ENVIRONMENT

(75) Inventors: Shoji Imaizumi, Shinshiro (JP); Kaoru Fukuoka, Toyokawa (JP); Tomoyuki Atsumi, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1027 days.

(21) Appl. No.: 12/403,820

(22) Filed: Mar. 13, 2009

(65) Prior Publication Data

US 2009/0310169 A1 Dec. 17, 2009

(30) Foreign Application Priority Data

Jun. 17, 2008 (JP) ................................. 2008-158272

(51) Int. Cl.
*G06F 3/12* (2006.01)
*G06K 15/00* (2006.01)
(52) U.S. Cl. ..................... 358/1.15; 358/1.14; 358/1.13; 358/1.16; 358/442
(58) Field of Classification Search .................. None
See application file for complete search history.

(56) References Cited

U.S. PATENT DOCUMENTS

| | | | | |
|---|---|---|---|---|
| 6,639,693 B1* | 10/2003 | Ejiri et al. | ..................... | 358/434 |
| 6,785,022 B1* | 8/2004 | Todaka | ......................... | 358/442 |
| 6,876,461 B2* | 4/2005 | Usami | ......................... | 358/1.15 |
| 2001/0022668 A1* | 9/2001 | Gassho et al. | .............. | 358/1.15 |
| 2003/0208471 A1* | 11/2003 | Kirshenbaum | ................... | 707/1 |
| 2004/0100653 A1* | 5/2004 | Azami | ......................... | 358/1.15 |
| 2005/0028173 A1* | 2/2005 | Aiba | ............................ | 719/327 |
| 2007/0268509 A1* | 11/2007 | Andreoli et al. | ............. | 358/1.14 |
| 2008/0158598 A1* | 7/2008 | Yoshii et al. | ................. | 358/1.15 |
| 2008/0204793 A1* | 8/2008 | Shaw | ........................... | 358/1.15 |
| 2008/0244752 A1* | 10/2008 | Gudan et al. | .................... | 726/27 |
| 2012/0140261 A1* | 6/2012 | DeRoller | ..................... | 358/1.14 |

FOREIGN PATENT DOCUMENTS

JP 2006-334870 A 12/2006

* cited by examiner

*Primary Examiner* — Satwant Singh
(74) *Attorney, Agent, or Firm* — Buchanan Ingersoll & Rooney PC

(57) ABSTRACT

A plurality of MFPs are connected to a data transfer system, and one of the MFPs functions as a representing MFP. The representing MFP monitors a connection status of the MFPs and a PC to the data transfer system. Upon detection of a change in the connection status, the representing MFP assigns the PC connected to the data transfer system after the change to each of the plurality of MFPs in an order up to a maximum number of PCs that can be connected, and has information necessary for carrying out data transfer to the PC be stored in the MFPs connected to the data transfer system in a distributed manner.

13 Claims, 11 Drawing Sheets

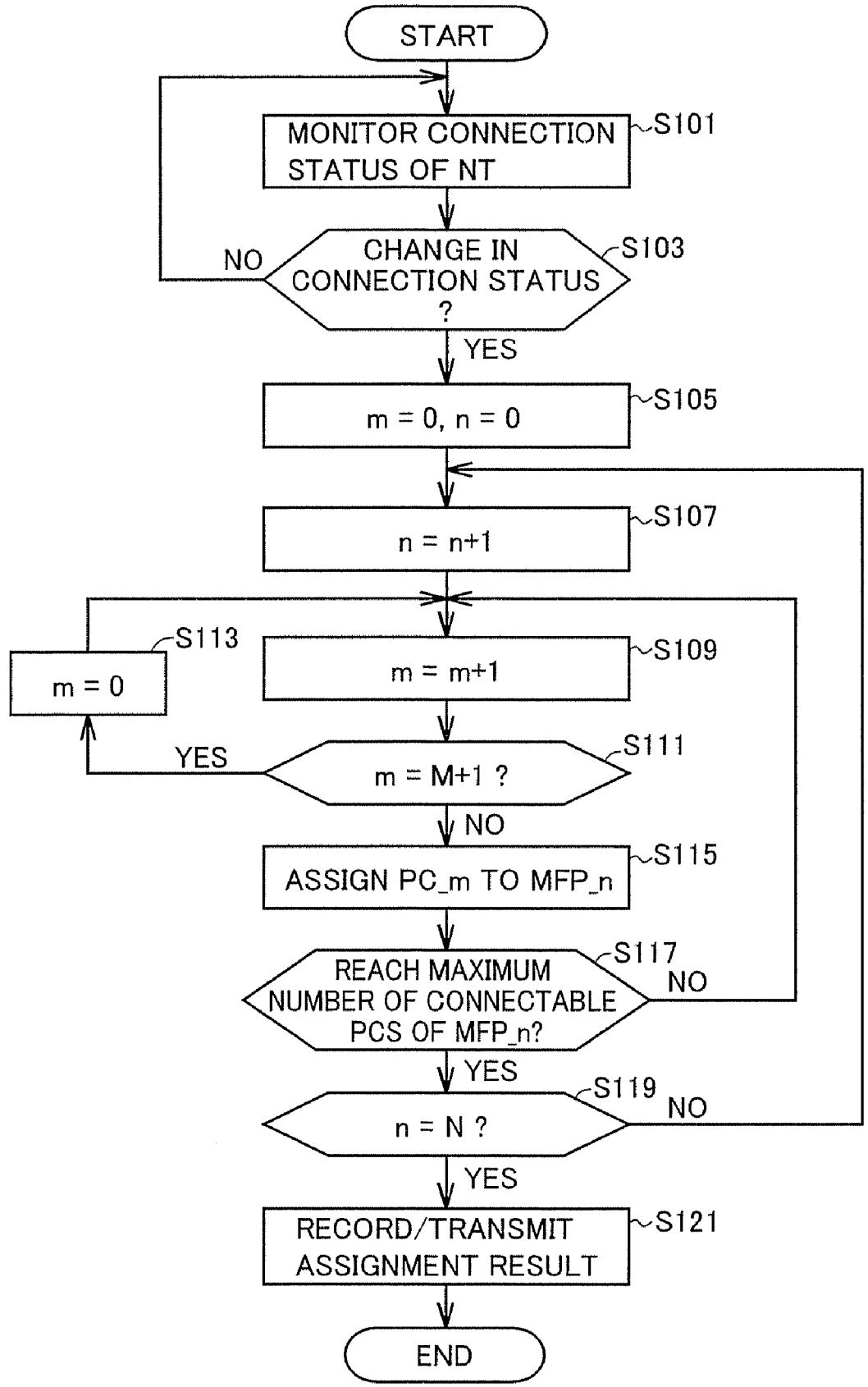

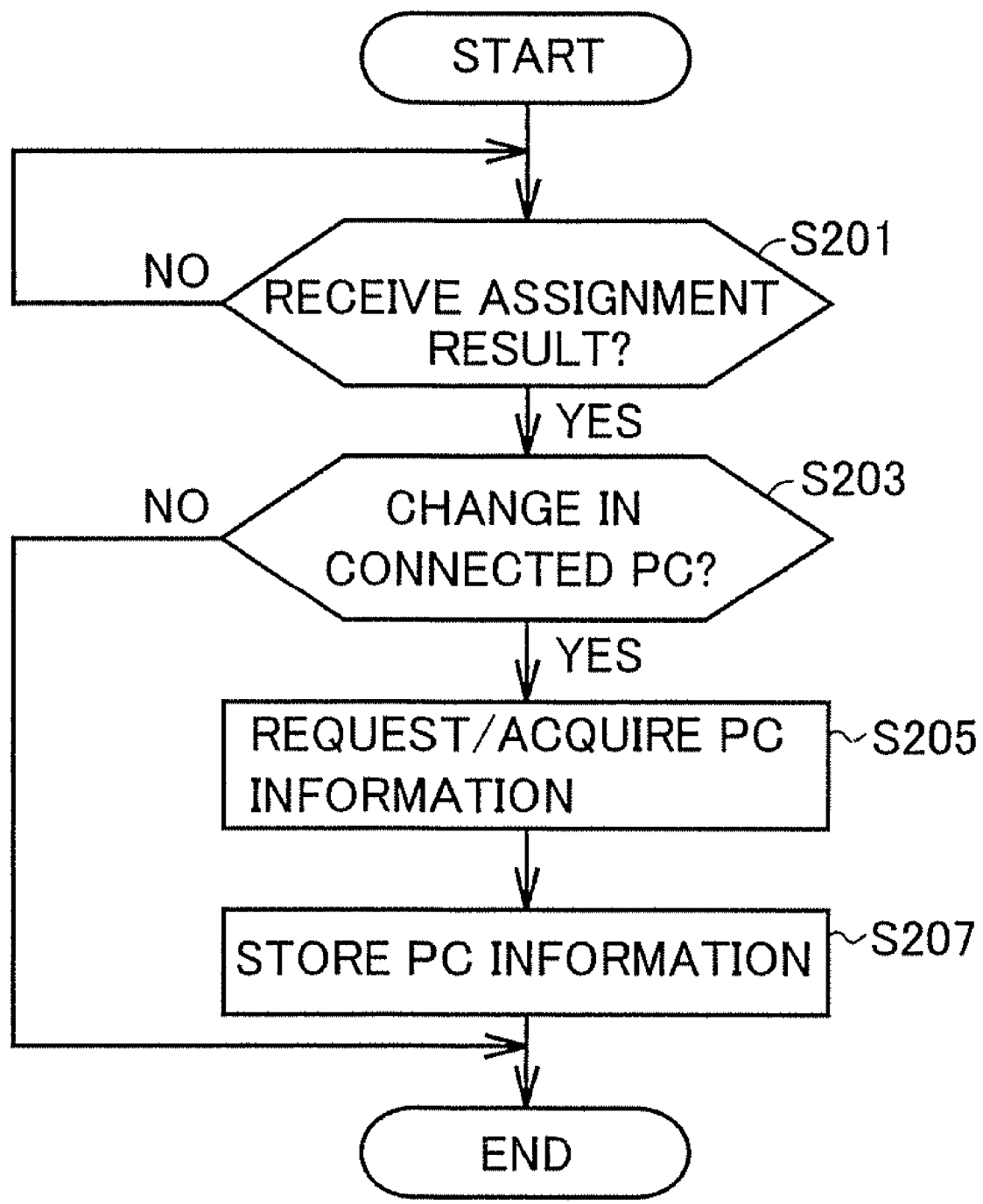

FIG.6A

|  | PC_1 | PC_2 | PC_3 | PC_4 | PC_5 | PC_6 | PC_7 | PC_8 | PC_9 | PC_10 |
|---|---|---|---|---|---|---|---|---|---|---|
| MFP_1 | 1 | 2 | 3 | 4 | 5 | 6 | — | — | — | — |
| MFP_2 | 5 | 6 | — | — | — | — | 1 | 2 | 3 | 4 |
| MFP_3 | — | — | 1 | 2 | 3 | 4 | 5 | 6 | — | — |
| MFP_4 | 3 | 4 | 5 | 6 | — | — | — | — | 1 | 2 |
| MFP_5 | — | — | — | — | 1 | 2 | 3 | 4 | 5 | 6 |

FIG.6B

|  | PC_1 | PC_2 | PC_3 | PC_4 | PC_5 | PC_6 | PC_7 | PC_8 | PC_9 | PC_10 |
|---|---|---|---|---|---|---|---|---|---|---|
| MFP_1 | 1 | 2 | 3 | 4 | 5 | 6 | — | — | — | — |
| MFP_2 | — | — | — | — | — | — | — | — | — | — |
| MFP_3 | 5 | 6 | — | — | — | — | 1 | 2 | 3 | 4 |
| MFP_4 | — | — | — | — | — | — | — | — | — | — |
| MFP_5 | — | — | 1 | 2 | 3 | 4 | 5 | 6 | — | — |

FIG.6C

|  | PC_1 | PC_2 | PC_3 | PC_4 | PC_5 | PC_6 | PC_7 | PC_8 | PC_9 | PC_10 |
|---|---|---|---|---|---|---|---|---|---|---|
| MFP_1 | 1 | — | — | 2 | 3 | — | 4 | 5 | 6 | — |
| MFP_2 | 2 | — | — | 3 | 4 | — | 5 | 6 | — | 1 |
| MFP_3 | 3 | — | — | 4 | 5 | — | 6 | — | 1 | 2 |
| MFP_4 | 4 | — | — | 5 | 6 | — | — | 1 | 2 | 3 |
| MFP_5 | 5 | — | — | 6 | — | — | 1 | 2 | 3 | 4 |

FIG.7A

MFP_1

| PC_1_Print |
| PC_1_Scan |
| PC_1_E-mail |
| PC_1_OCR |
| PC_1_FAX |
| PC_2_Print |
| PC_2_Scan |
| PC_2_E-mail |
| PC_2_OCR |
| PC_2_FAX |
| PC_3_Print |
| PC_3_Scan |
| PC_3_E-mail |
| PC_3_OCR |
| PC_3_FAX |

FIG.7B

MFP_2

| PC_1_Print |
| PC_1_Scan |
| PC_1_E-mail |
| PC_1_OCR |
| PC_1_FAX |
| PC_2_Print |
| PC_2_Scan |
| PC_2_E-mail |
| PC_2_OCR |
| PC_2_FAX |
| PC_3_Print |
| PC_3_Scan |
| PC_3_E-mail |
| PC_3_OCR |
| PC_3_FAX |

FIG.7C

MFP_3

| PC_1_Print |
| PC_1_Scan |
| PC_1_E-mail |
| PC_1_OCR |
| PC_1_FAX |
| PC_2_Print |
| PC_2_Scan |
| PC_2_E-mail |
| PC_2_OCR |
| PC_2_FAX |
| PC_3_Print |
| PC_3_Scan |
| PC_3_E-mail |
| PC_3_OCR |
| PC_3_FAX |

FIG.8A

MFP_1

| PC_1_Print |
| PC_1_Scan |
| PC_1_E-mail |
| PC_1_OCR |
| PC_1_FAX |
| PC_2_Print |
| PC_2_Scan |
| PC_2_E-mail |
| PC_2_OCR |
| PC_2_FAX |
| PC_3_Print |
| PC_3_Scan |
| PC_3_E-mail |
| PC_3_OCR |
| PC_3_FAX |

FIG.8B

MFP_2

| PC_1_Print |
| PC_1_Scan |
| PC_1_E-mail |
| PC_1_OCR |
| PC_1_FAX |
| PC_2_Print |
| PC_2_Scan |
| PC_2_E-mail |
| PC_2_OCR |
| PC_2_FAX |
| PC_3_Print |
| PC_3_Scan |
| PC_3_E-mail |
| PC_3_OCR |
| PC_3_FAX |

FIG.8C

MFP_3

| PC_1_Print |
| PC_1_Scan |
| PC_1_E-mail |
| PC_1_OCR |
| PC_1_FAX |
| PC_2_Print |
| PC_2_Scan |
| PC_2_E-mail |
| PC_2_OCR |
| PC_2_FAX |
| PC_3_Print |
| PC_3_Scan |
| PC_3_E-mail |
| PC_3_OCR |
| PC_3_FAX |

FIG.13

| ID | 12345 |
|---|---|
| PASSWORD | 54321 |
| PRINT | PERMISSION |
| SCAN | PERMISSION |
| E-mail | PROHIBITION |
| OCR | PROHIBITION |
| FAX | PROHIBITION |

FIG.14A

| PC_1_Print |
|---|
| PC_1_Scan |
| PC_1_E-mail |
| PC_1_OCR |
| PC_1_FAX |
| PC_2_Print |
| PC_2_Scan |
| PC_2_E-mail |
| PC_2_OCR |
| PC_2_FAX |
| PC_3_Print |
| PC_3_Scan |
| PC_3_E-mail |
| PC_3_OCR |
| PC_3_FAX |

FIG.14B

| PC_1_Print |
|---|
| PC_1_Scan |
| PC_1_E-mail |
| PC_1_OCR |
| PC_1_FAX |
| PC_2_Print |
| PC_2_Scan |
| PC_2_E-mail |
| PC_2_OCR |
| PC_2_FAX |
| PC_3_Print |
| PC_3_Scan |
| PC_3_E-mail |
| PC_3_OCR |
| PC_3_FAX |

FIG.14C

| PC_1_Print |
|---|
| PC_1_Scan |
| PC_1_E-mail |
| PC_1_OCR |
| PC_1_FAX |
| PC_2_Print |
| PC_2_Scan |
| PC_2_E-mail |
| PC_2_OCR |
| PC_2_FAX |
| PC_3_Print |
| PC_3_Scan |
| PC_3_E-mail |
| PC_3_OCR |
| PC_3_FAX |

IMAGE FORMING APPARATUS OF EFFICIENTLY STORING INFORMATION RELATING TO CLIENT APPARATUSES IN NETWORK ENVIRONMENT

This application is based on Japanese Patent Application No. 2008-158272 filed with the Japan Patent Office on Jun. 17, 2008, the entire content of which is hereby incorporated by reference.

BACKGROUND OF THE INVENTION

1. Field of the Invention

The present invention relates to an image forming apparatus, a data transfer system and an information management method for the apparatus and the system, and in particular, to an image forming apparatus used in a network environment, a data transfer system constructed in such a network environment, and an information management method for such an apparatus and a system.

2. Description of the Related Art

In a network environment constructed in an office and the like, an image forming apparatus such as a copying machine, a printing machine, or a MFP (Multi Function Peripheral) as a digital complex machine having functions of copying and printing machines is typically used. Depending on a configuration of the network, a single image forming apparatus can be used by a plurality of client apparatuses. In a case in which a plurality of image forming apparatuses and a number of client apparatuses are included in a network, it is also conceivable that each image forming apparatus exchanges data with all of the client apparatuses.

As one application of such an image forming apparatus in a network environment, for example, an image forming apparatus and a client apparatus are used together to realize a function in cooperation such that the client apparatus outputs an instruction to the image forming apparatus and the image forming apparatus outputs specified image data.

In order that an image forming apparatus and a client apparatus are used together to realize a function in cooperation, it is required that the image forming apparatus holds information relating to client apparatuses that are connected to the network. If the network includes a plurality of image forming apparatuses and all the client apparatuses use each image forming apparatus, it is required that each image forming apparatus holds information relating to all of the client apparatuses. In Japanese Laid-Open Patent Publication No. 2006-334870 that has been previously filed and is already published, the present applicant discloses a technique relating to a function that a plurality of image forming apparatuses included in a network share information relating to client apparatuses without using a server.

When the network includes a number of client apparatuses, assuming that each image forming apparatus holds information relating to all of the client apparatuses, each image forming apparatus must have a memory having a large capacity. This disadvantageously hinders cost reduction of an image forming apparatus.

Each of the image forming apparatuses connected to the network stores information relating to the client apparatuses of a number corresponding to an amount of its memory. Accordingly, when an amount of information relating to the client apparatuses that is stored reaches the maximum amount of memory of an image forming apparatus having a capacity that is the largest among that of the image forming apparatuses connected to the network, a problem occurs that, even if the network includes a plurality of image forming apparatuses and a total amount of memory for the network as a whole is large, a client apparatus that is connected to the network over the number corresponding to the amount of memory of the image forming apparatus having the largest capacity cannot exchange data with any of the image forming apparatuses.

Moreover, when a single image forming apparatus stores information relating to a number of client apparatuses and the image forming apparatus is operated to exchange data with one of the client apparatuses, as many options as the number of the client apparatuses that are stored in the information are presented. This, as a result, makes an operating procedure complex and can results in a faulty operation, disadvantageously causing an operation different from an intended one.

SUMMARY OF THE INVENTION

The present invention is contrived in view of the above problems, and an object of the present invention is to provide an image forming apparatus, which is used in a network environment including a plurality of image forming apparatuses and a plurality of client apparatus, capable of efficiently storing information relating to the client apparatuses, a data transfer system including such an image forming apparatus, and an information management method for such an apparatus and a system.

In order to realize the above object, according to one aspect of the present invention, there is provided an image forming apparatus included in a data transfer system, the apparatus including: a storage unit that stores information relating to a plurality of client apparatuses, the information being necessary for the image forming apparatus to identify the client apparatus when data is transferred from the client apparatus out of the plurality of client apparatuses included in the data transfer system; a detection unit that detects client apparatuses connected to the data transfer system out of the plurality of client apparatuses that belong to the data transfer system and at least one other image forming apparatus connected to the data transfer system; an assignment unit that shares assignment of the information relating to the client apparatuses connected to the data transfer system among the image forming apparatuses connected to the data transfer system for storing; and a transmission unit that transmits, to each the other image forming apparatus that has been assigned to by the assignment unit, the information relating to the assigned client apparatuses.

According to a different aspect of the present invention, there is provided an image forming apparatus included in a data transfer system, the apparatus including: a reception unit that receives information from one other image forming apparatus out of a plurality of image forming apparatuses included in the data transfer system, the information relating to client apparatuses that correspond to the image forming apparatus and are connected to the data transfer system, the information being necessary for transferring data to the client apparatuses from the image forming apparatus; a storing unit that stores the information relating to the client apparatuses; and a presentation unit that presents options for a transfer destination to which data is transferred based on the information relating to the client apparatuses stored in the storing unit, wherein the presentation unit presents the options for the transfer destination based on the information relating to the client apparatuses that corresponds to the image forming apparatus and information relating to client apparatuses that correspond to the other image forming apparatus.

According to yet another aspect of the present invention, there is provided a data transfer system including: a plurality of image forming apparatuses; and a client apparatus, wherein a first image forming apparatus included in the plurality of image forming apparatuses includes, a storage unit that stores information relating to the client apparatuses, the information being necessary for the first image forming apparatus to identify the client apparatus when data is transferred to the first image forming apparatus from the client apparatus, a detection unit that detects a change in a connection status of the client apparatuses and the plurality of image forming apparatuses to the data transfer system, an assignment unit that shares, when the detection unit has detected the change in the connection status, assignment of the information relating to the client apparatuses connected to the data transfer system among the plurality of image forming apparatuses connected to the data transfer system after the change for storing, and a transmission unit that transmits, to each of the plurality of image forming apparatuses, the information relating to the client apparatuses that have been assigned by the assignment unit, and each of the plurality of image forming apparatuses includes: an acquisition unit that acquires, from the first image forming apparatus, the information relating to the client apparatuses that correspond to the image forming apparatus; and a storing unit that stores the information relating to the client apparatuses that correspond to the image forming apparatus.

According to yet another aspect of the present invention, there is provided an information management method carried out by an image forming apparatus included in a data transfer system, the method comprising the steps of: detecting client apparatuses connected to the data transfer system out of a plurality of client apparatuses that belong to the data transfer system and at least one other image forming apparatus connected to the data transfer system; sharing assignment of the information relating to the client apparatuses connected to the data transfer system among the image forming apparatuses connected to the data transfer system for storing; and transmitting, to each the other image forming apparatus, the information relating to the client apparatuses that have been assigned.

According to yet another aspect of the present invention, there is provided an information management method carried out by a plurality of image forming apparatuses including a first image forming apparatus in a data transfer system, the data transfer system including a client apparatus, the method comprising the steps of: the first image forming apparatus detecting a change in a connection status of the client apparatuses and the plurality of image forming apparatuses to the data transfer system; the first image forming apparatus sharing, when the change in the connection status has been detected, assignment of the information relating to the client apparatuses connected to the data transfer system among the image forming apparatuses connected to the data transfer system after the change for storing; the first image forming apparatus transmitting, to each the other image forming apparatus, the information relating to the client apparatuses that have been assigned; each the other image forming apparatus receiving, from the first image forming apparatus, the information relating to the client apparatuses that correspond to each the other image forming apparatus; and each the other image forming apparatus storing the information relating to the client apparatuses that correspond to the other image forming apparatus.

The image forming apparatus and the data transfer system including the image forming apparatus according to the present invention, even when a storage capacity of each image forming apparatus is smaller than a capacity required for storing information relating to all of the client apparatuses that are connected to the data transfer system, information relating to the connected client apparatuses can be efficiently stored in the data transfer system as a whole.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a flowchart illustrating a specific example of a process carried out by the representing MFP according to the first embodiment.

FIG. 5 is a flowchart illustrating a specific example of a process carried out by the MFPs other than the representing MFP according to the first embodiment.

FIGS. 6A to 6C are diagrams each illustrating an assignment condition of how PCs are assigned to the MFPs in the data transfer system according to the first embodiment.

FIGS. 7A to 7C and FIGS. 8A to 8C are diagrams each illustrating an assignment condition of how the PCs and functions are assigned to the MFPs in the data transfer system according to a modified example of the first embodiment.

FIG. 13 is a diagram illustrating a specific example of user information.

FIGS. 14A to 14C are diagrams each illustrating an assignment condition of how the PCs and functions are assigned to the MFPs in the data transfer system according to a modified example of the second embodiment.

DESCRIPTION OF THE PREFERRED EMBODIMENTS

The following describes embodiments of the present invention with reference to the drawings. In the description below, the like components and constituent elements are represented by the like reference symbols. Names and functions for these components and constituent elements are also the same.

Figure 1:
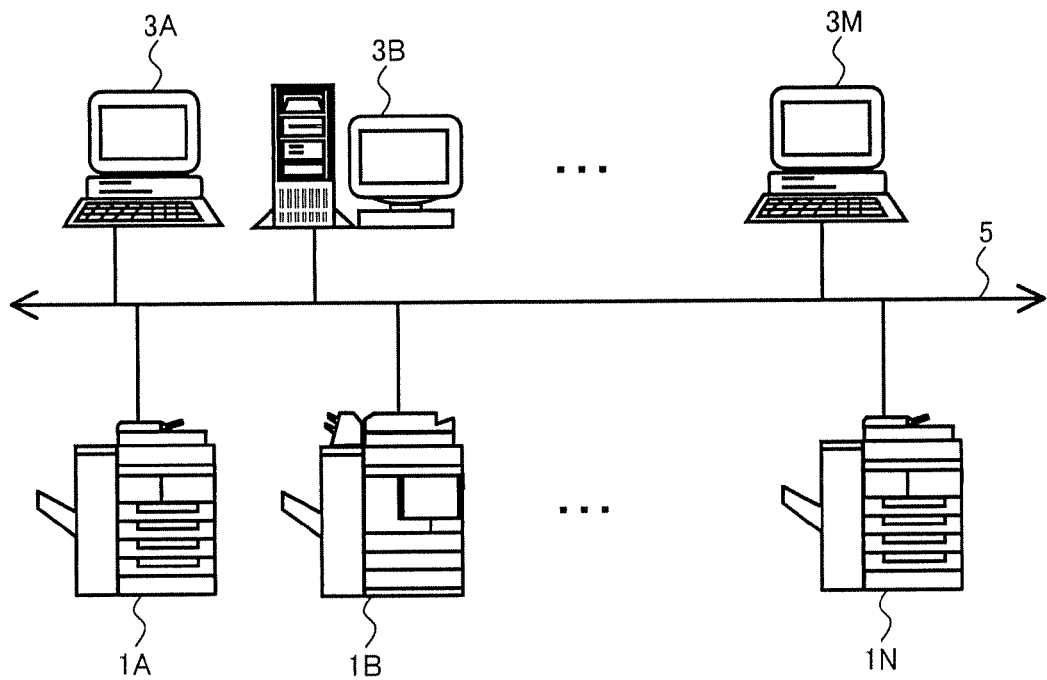
FIG. 1 is a diagram illustrating a specific example of a structure of a data transfer system according to an embodiment of the present invention.

Referring to FIG. 1, a data transfer system according to the embodiment includes a plurality of MFPs (Multi Function Peripherals) 1A, 1B, . . . , 1N as image forming apparatuses, and a plurality of personal computers (hereinafter referred to as PCs) 3A, 3B, . . . , 3M as client apparatuses, which are connected to each other over a network 5. In the following description, MFPs 1A, 1B, . . . , 1N as a whole are generally referred to as an MFP 1, and PCs 3A, 3B, . . . , 3M as a whole are generally referred to as a PC 3. Network 5 can be configured either such that communication is carried out via a wire, or such that communication is carried out wirelessly. Network 5 can be configured either such that communication is carried out via a public line such as the Internet, or such that communication is carried out via a dedicated line.

MFP 1 is provided with a print function of printing image data onto a sheet of printing paper, a scan function of optically scanning a document to acquire image data, a mail function of transferring image data by an electronic mail, a facsimile function of sending image data on facsimile transmission, and an OCR (Optical Character Reader) function of identifying characters from image data to input the characters. In the following example, each MFP 1 included in the data transfer system is provided with all of the above functions. However, MFP 1 do not have to be provided with all of the functions, and can be provided with a different function as well.

Figure 2:
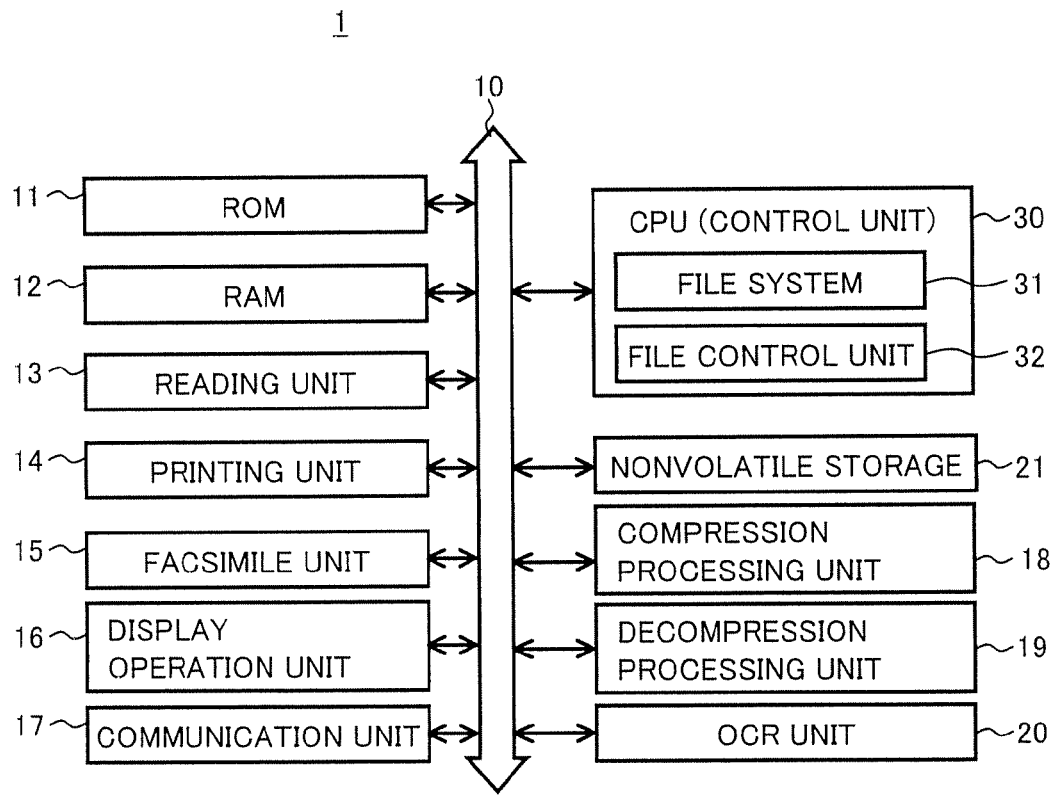
FIG. 2 is a block diagram illustrating a specific example of a hardware structure of an MFP (Multi Function Peripheral) according to the embodiment of the present invention.

Referring to FIG. 2, MFP 1 is provided with a ROM (Read Only Memory) 11, a RAM (Random Access Memory) 12, a reading unit 13, a printing unit 14, a facsimile unit 15, a display operation unit 16, a communication unit 17, a compression processing unit 18, a decompression processing unit 19, an OCR unit 20, a nonvolatile storage 21, and a CPU (Central Processing Unit) 30. These are connected to each other over a bus 10.

Reading unit 13 acquires image data by optically reading a document placed on a platen. OCR unit 20 identifies a character and acquires character data by matching the image data that has been optically read with a previously stored pattern. Compression processing unit 18 compresses the image data, and decompression processing unit 19 decompresses the image data. The acquired image data is subject to these processes as required. The acquired image data is stored in a storage device such as RAM 12 as required.

Printing unit 14 prints specified image data or the previously stated character data on a sheet of printing paper a print medium. Facsimile unit 15 transfers the specified image data or the previously stated character data to a specified destination using a telephone line. Communication unit 17 communicates with other devices via network 5, and transfers the specified image data or the previously stated character data to the specified destination by an electronic mail. Further, communication unit 17 receives an operation signal for operating MFP 1 from PC 3 connected to network 5 and inputs the signal into CPU 30.

Display operation unit 16 is provided to a front side of MFP 1 and the like. Display operation unit 16 includes a panel for information display, buttons for operation, and the like. Display operation unit 16 inputs an operation signal according to a button or such that has been operated into CPU 30.

CPU 30 functions as a control unit that controls the device as a whole. CPU 30 reads and executes a program that is stored, and outputs a control signal to each unit, thereby having each unit carry out a process corresponding to the operation signal described above. Further, CPU 30 includes a file system 31 and a file control unit 32. File system 31 indicates a function of automatically detecting a device that is connected to the data transfer system according to DPWS (Device Profile for Web Service) protocol, which is a protocol for improving user-friendliness for management of the devices and confirmation of the condition when connecting the network. File control unit 32 indicates a function of carrying out a process as described below to manage the connection between MFP 1 and PC 3. These functions are structured into CPU 30 by CPU 30 executing a program.

In ROM 11 as a storage device, a program executed by CPU 30 is stored. Further, in RAM 12 as a storage device, information relating to a PC that is connectable by MFP 1 is stored. The "PC that is connectable" indicates a client apparatus to which data can be transferred using the various functions of the MFP as described above, and/or a client apparatus capable of being used in data transfer. In the description below, the information relating to a PC that is connectable is referred to as "PC information". The PC information is necessary when the MFP identifies a source PC in data transfer from this PC to the MFP, and includes at least information for identification for the PC and information for authorization relating to the data transfer from the PC. Functions used in the data transfer include a PC print function, a PC scan function, a PC e-mail function, a PC facsimile function and the like. The PC print function indicates a function of pull printing an image stored in the PC. The PC scan function indicates a function of transferring image data acquired by scanning to the PC and storing the image data in the PC. The PC e-mail function indicates a function of transferring the image stored in the PC by e-mail. The PC facsimile function indicates a function of transferring the image stored in the PC by facsimile. The PC print function can be a function of printing the image according to a print command from the PC. The PC e-mail function and the PC facsimile function can be a function of transferring specified image to the PC. The PC information, as shown in FIG. 13 that will be described later, includes information indicating permission or prohibition of each function about use of the PC as the information for authorization relating to the data transfer. Alternatively, the information for authorization relating to the data transfer can be information indicating a range of permission.

Among the plurality of MFPs 1A, 1B, . . . , 1N that are included in the data transfer system, an MFP as a representative has RAM 12 with a storage capacity greater that that of other MFPs, and stores the PC information for all of the client apparatuses included in the data transfer system. The MFP as a representative is hereinafter referred to as a "representing MFP". RAM 12 of the MFPs other than the representing MFP has a storage capacity smaller than that of the representing MFP, and stores at least the PC information for the PC to which the MFP is connectable. The structures of the representing MFP and the MFPs other than the representing MFP are the same as the structure shown in FIG. 2. As described above, each MFP can be provided with different functions, and therefore the structure corresponding to the function can be different from the structure shown in FIG. 2.

First Embodiment

Figure 3:
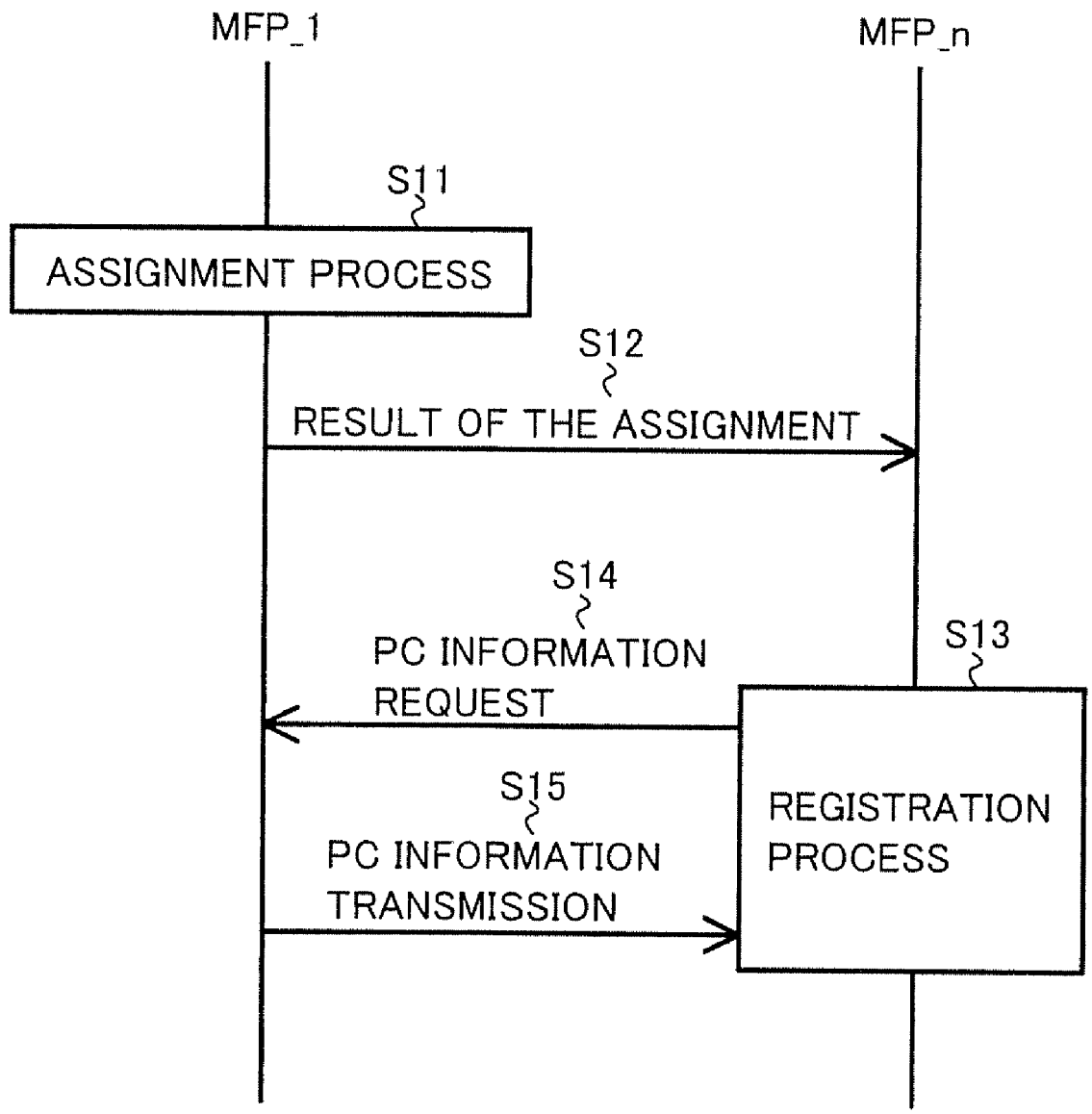
FIG. 3 is a diagram schematically illustrating a processing flow between a representing MFP and other MFPs in a data transfer system according to a first embodiment.

FIG. 3 is a diagram schematically illustrating a processing flow between the representing MFP and the MFPs other than the representing MFP in the data transfer system according to a first embodiment. In FIG. 3, the representing MFP is represented by an MFP_1, and the MFPs other than the representing MFP are represented by an MFP_n. MFP_n that represents the MFPs other than the representing MFP includes MFP_1 when functioning as the other MFP.

Referring to FIG. 3, MFP_1 as the representing MFP carries out an assignment process in step S11. With this process, each of the MFPs included in the data transfer system is assigned with the PCs that are connectable to the MFP. Then, in step S12, the result of the assignment is transferred to each MFP_n. In response to this result, in step S13, MFP_n carries out a registration process of registering an assigned PC as a PC that is connectable to this MFP_n. At this time, if the result of the assigned PC includes PC information for a PC that has not been connectable before the process and not stored, MFP_n requests MFP_1 for the PC information in step S14, and acquires the PC information from MFP_1 in step S15.

FIG. 4 is a flowchart illustrating a specific example of the process carried out by MFP 1 as the representing MFP. The process shown in the flowchart of FIG. 4 corresponds to steps S11 and S12 in FIG. 3, and can be realized by CPU 30 of the representing MFP reading and executing a program stored in ROM 11, and controlling each unit shown in FIG. 2.

Referring to FIG. 4, in step S101, file system 31 monitors connection status of the apparatuses on the data transfer system. An example of the monitoring method in step S101 is such that, for example, file system 31 regularly sends out a request to network 5 for a response, and analyzes the response, thereby detecting a newly connected/disconnected apparatus. Alternatively, there is another method such that, when connecting/disconnecting to the data transfer system, each apparatus sends out a signal indicating this to network 5, and a newly connected/disconnected apparatus is detected by receiving of the signal by file system 31. When file system 31 detects a newly connected/disconnected apparatus in the data transfer system, and determines that the connection status has changed (YES in step S103), file control unit 32 carries out the following process.

In step S105, file control unit 32 initializes variable numbers m and n, and then, in steps S107 and S109, respectively increments the variable numbers n and m by one. The variable number m corresponds to each PC connected to the data transfer system. The variable number n corresponds to each MFP connected to the data transfer system. If the variable number m does not exceed a maximum number M of the PCs that are connected to the data transfer system (NO in step S111), in step S115, file control unit 32 assigns PC_m as a PC that corresponds to the current variable number m to MFP_n as the MFP that corresponds to the current variable number n. If the variable number m exceeds the maximum number M of the PCs that are included in the data transfer system when the variable number m is incremented in step S109 described above (YES in step S111), file control unit 32 initializes the variable number m again in step S113, and then, returning to step S109, further increments the variable number m by one. Then, in step S115, file control unit 32 assigns PC_m as the PC that corresponds to the current variable number m to MFP_n as the MFP that corresponds to the current variable number n.

The representing MFP previously stores, for each MFP, a maximum number of PCs to which the MFP can connect. File control unit 32 repeats steps S109 to S117 described above until the number of PCs connected to MFP_n as the MFP that corresponds to current the variable number n reaches the maximum number that MFP_n can connect, to assign the PCs to MFP_n until the number reaches the maximum number. When the number of PCs assigned to MFP_n as the MFP that corresponds to the current variable number n reaches the maximum number that MFP_n can connect (YES in step S117), and if the current variable number n has not reached a maximum number N that is included in the data transfer system (NO in step S119), file control unit 32 returns the process to step S107, and increments the variable number n by one to carry out the steps from steps S109 to S117 described above to the MFP that corresponds to the next variable number. Specifically, file control unit 32 carries out the steps in steps S109 to S117 to all of the MFPs that are connected to the data transfer system. Then, when the variable number n reaches the maximum number N (YES in step S119), in step S121, file control unit 32 has the storage device such as RAM 12 store the result of the assignment. In addition, file control unit 32 transmits the result of the assignment to each MFP, and terminates the process.

FIG. 5 is a flowchart illustrating a specific example of a process carried out by MFP 1 as the MFP other than the representing MFP. The process shown in the flowchart in FIG. 5 corresponds to the steps in steps S13 and S14 in FIG. 3, and is realized by CPU 30 of the MFP other than the representing MFP reading a program stored in ROM 11 and executing the program to control each unit shown in FIG. 2.

Referring to FIG. 5, in step S201, upon reception from the representing MFP of the result of the assignment that has been transmitted to the representing MFP in step S121 described above, file control unit 32 compares the PC information stored in RAM 12 and the result of the assignment, and determines whether or not there is any change for the MFP about the PC to which the MFP can connect (step S203). When it is determined that there is a change (YES in step S203), in step S205, file control unit 32 requests the representing MFP for PC information for a PC that is newly made connectable, and in step S15, acquires the PC information transmitted from the representing MFP. Then, in step S207, file control unit 32 stores the acquired PC information in RAM 12, and registers the newly connectable PC for the MFP by deleting the PC information for a PC that is now made unconnectable from RAM 12 based on the result of the assignment.

A specific description regarding a change in an assignment condition of PC 3 to MFP 1 by the above process carried out by the representing MFP and the MFPs other than the representing MFP is now given referring to FIGS. 6A to 6C. FIGS. 6A to 6C are diagrams illustrating specific examples of the result of the assignment stored in RAM 12 of the representing MFP and the like in step S121 described above. In the specific examples shown in FIGS. 6A to 6C, the data transfer system includes five MFPs from MFP_1 to MFP_5, and 10 PCs of PC_1 to PC_10. Further, out of the five MFPs, MFP_1 is the representing MFP. Moreover, the maximum number of the PCs that can be connected to each MFP is six.

FIG. 6A shows the specific example of the assignment condition when all the MFPs and the PCs are connected to the data transfer system, for example, such as, immediately after the data transfer system has been constructed. By MFP_1 as the representing MFP carrying out the process shown in FIG. 4, each MFP is assigned with the PCs in an order of the variable numbers until the number of the PCs reaches the maximum number of the connectable PCs. More specifically, according to the process, first of all, PC_1 to PC_6 that are six PCs counting from PC_1 are assigned to MFP_1. Next, six PCs including subsequent PC_7 to PC_10 and, returning to the top of the order, PC_1 to PC_2 are assigned to MFP_2. The assignment to the MFPs from MFP_3 to MFP_5 is also carried out according to the order of the variable numbers, thus the PCs are assigned to all of the MFPs according to the order of the variable numbers. With this, as shown in FIG. 6A, the PC information for six PCs in the order of the variable numbers is stored in each of MFP_2 to MFP_10 that are the MFPs other than the representing MFP.

Specifically, by carrying out the above described assignment process to the MFP according to the first embodiment and assigning the PC information to each MFP, MFPs share and store the PC information for the PCs that are connected to the data transfer system. Accordingly, even if each MFP other than the representing MFP is not provided with a storage device of a capacity that can store the PC information relating to all the PCs that are included in the data transfer system, and when the number of the PCs included in the data transfer system is greater than the maximum number of the PCs that can be connected to the MFP, the PC can be connected to any of the MFPs included in the data transfer system.

FIG. 6B shows the assignment condition when the connection status of the MFPs has changed from the condition in which the assignment is done as shown in FIG. 6A, and more specifically, shows the specific example of the assignment condition when MFP_2 and MFP_4 are disconnected from the data transfer system. As described above, in step S103, when file system 31 of MFP_1 as the representing MFP detects that the MFPs have been disconnected from the data transfer system, file control unit 32 again carries out the steps in and after step S105 as described above and the reassignment is carried out. In this case, as MFP_2 and MFP_4 are disconnected, each of MFP_1, MFP_3, and MFP_5 is assigned in order with the PCs in the order of the variable numbers until the number of the PCs reaches the maximum number of the connectable PCs. More specifically, referring to FIG. 6B, according to the process, first of all, PC_1 to PC_6 that are six PCs counting from PC_1 are assigned to MFP_1. Next, six PCs including subsequent PC_7 to PC_10 and, returning to the top of the order, PC_1 to PC_2 are assigned to MFP_3. The assignment to MFP_5 is also carried out, thus the PCs are assigned to these MFPs according to the order of the variable numbers. With this, even when the connection status of the MFPs in the data transfer system changes, the PCs are assigned again to the MFPs after the change as shown in FIG. 6B.

FIG. 6C shows the assignment condition when the connection status of the PCs has changed from the condition in which the assignment is done as shown in FIG. 6A, and more specifically, shows the specific example of the assignment condition when PC2, PC_3, and PC_6 are disconnected from the data transfer system. As described above, in step S101, when file system 31 of MFP_1 as the representing MFP detects that the PCs have been disconnected from the data transfer system, file control unit 32 again carries out the steps in and after step S105 as described above and the assignment is carried out again. More specifically, referring to FIG. 6C, according to the process, six PCs including PC_1, PC_4, PC_5, PC_7, PC_8, and PC_9 are assigned to MFP_1 according to the order of the variable numbers. Next, six PCs including subsequent PC_10, and, returning to the top of the order, PC_1, PC_4, PC_5, PC_7, and PC_8 are assigned to MFP_2 according to the order of the variable numbers. The assignment to MFP_3 and the MFPs after MFP_3 is also carried out according to the order of the variable numbers, thus the PCs are assigned to these MFPs according to the order of the variable numbers. With this, even when the connection status of the PCs in the data transfer system changes, the PCs after the change are reassigned to the MFPs as shown in FIG. 6C.

Modified Example

The above described is the example in which information for identifying the connectable PCs is assigned as the PC information to the MFPs connected to the data transfer system. As another example of the assignment, functions of the PCs to be used can be assigned to the MFPs connected to the data transfer system when the information is transferred. The assignment process for MFP_1 as the representing MFP is such that the functions are assigned through a similar process as shown in FIG. 4 by assigning variable numbers to the functions of the PCs.

FIGS. 7A to 7C are diagrams illustrating specific examples of the result of the assignment stored in RAM 12 of the representing MFP and the like in step S121 when the PCs and the functions are assigned. In the specific examples shown in FIGS. 7A to 7C, the data transfer system includes three MFPs of MFP_1 to MFP_3 and three PCs of PC_1 to PC_3. Among these three MFPs, MFP_1 is the representing MFP. As described above, the data transfer using any function out of the print function, the scan function, the mail function, the OCR function, and the facsimile function that are provided for the MFP is possible by using the function of the corresponding PCs. In the specific examples shown in FIGS. 7A to 7C, as the PC information, for example, "PC_1_print" represents PC information allowing the data transfer with PC_1, to and from the MFP, using the print function.

With MFP_1 that is the representing MFP similarly carrying out the process shown in FIG. 4 for the functions, in the specific examples shown in FIGS. 7A to 7C, the PC information for allowing the data transfer with PC 1 using the print function, the scan function, the mail function, the OCR function, and the facsimile function is assigned to MFP_1 (FIG. 7A), the PC information for allowing the data transfer with both PC_2 and PC 3 using the print function, the scan function, the mail function, the OCR function, and the facsimile function is assigned to MFP_2 (FIG. 7B), and the PC information for allowing the data transfer with PC_3 using the print function, the scan function, the mail function, the OCR function, and the facsimile function is assigned to MFP_3 (FIG. 7C).

FIGS. 8A to 8C show the assignment conditions when the connection status of the MFPs has changed from the conditions in which the assignment is done as shown in FIGS. 7A to 7C, and more specifically, show the specific examples of the assignment conditions when MFP_2 is disconnected from the data transfer system. As described above, in step S103, when file system 31 of MFP_1 as the representing MFP detects that the MFP has been disconnected from the data transfer system, file control unit 32 again carries out the steps in and after step S105 as described above and the assignment is carried out again. In this case, as MFP_2 is disconnected, out of the PC information for allowing the data transfer with both PC_2 and PC 3 using the print function, the scan function, the mail function, the OCR function, and the facsimile function that has previously been assigned to MFP_2 (FIG. 7B), the PC information for allowing the data transfer with PC_2 using the print function, the scan function, the mail function, the OCR function, and the facsimile function is additionally assigned to MFP_1 (FIG. 8A).

Figure 9:
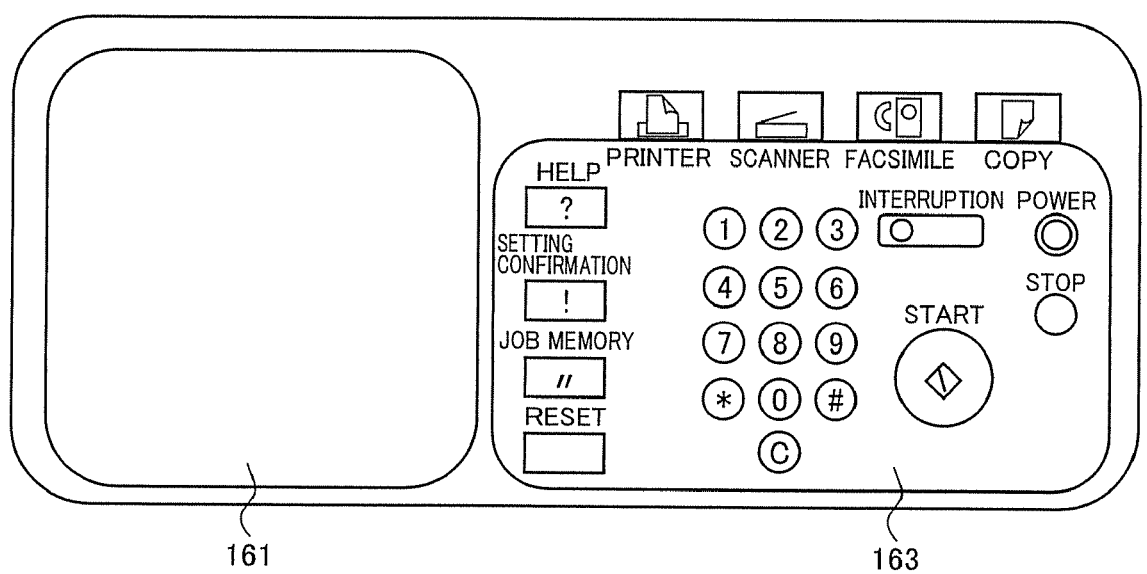
FIG. 9 is a diagram illustrating a specific example of a display operation unit on the MFP.

While FIGS. 7A to 7C and FIGS. 8A to 8C are the diagrams schematically illustrating the PC information stored in RAM 12 of each MFP, a screen displayed in display operation unit 16 when the operation is carried out using the MFP is the same as these diagrams. FIG. 9 is a diagram illustrating a specific example of display operation unit 16. Display operation unit 16 includes a panel section 161 and a button section 163. When the operation is carried out using display operation unit 16 for the data transfer, for example, when a function of MFP 1 used for the data transfer by a button for selecting a function included in button section 163 is selected, options for a transfer destination are displayed in panel section 161, and the transfer destination can be determined by selecting from the options. Alternatively, options for the transfer destination and the function used for the data transfer to the transfer destination displayed in panel section 161, and the transfer destination and the function of MFP 1 used for the data transfer to the transfer destination can be selected from the options. In the latter case, for example, when the operation is carried out using MFP_1, and when the PC information as shown in FIG. 7A is stored in RAM 12, the options for the transfer destination and the function for the data transfer to the transfer destination that are enclosed by a solid line in FIG. 7A are displayed in panel section 161. It should be noted that, when the operation signal is outputted to MFP_1 by activating a printer driver or the like at PC_1 that is connected to MFP_1, similarly, the PC information as shown in FIG. 7A is displayed as the options in the screen of the PC.

Specifically, for the MFP according to the present embodiment, by assigning the PC information to each MFP by carrying out the above described assignment process, each MFP stores the assigned PC information for the PCs connected to the data transfer system, and presents the PC information as the options for the data transfer. Accordingly, a single MFP does not present all the PCs that are connected to the data transfer system as options, thereby facilitating the selection operation. In addition, this prevents an erroneous operation.

In the above embodiment, the PC information is assigned to each of the plurality of MFPs in a distributed manner, and when carrying out the data transfer by operating a single MFP, as shown enclosed by a solid line in FIGS. 7A to 8C, the PCs that are stored in the MFP are presented as the options for the transfer destination. However, when operating a single MFP, it is possible to present all the PCs that are connected to the data transfer system as the options for the transfer destination by combining the PCs stored in other MFPs by making queries to other MFPs. For example, in the case of the example shown in FIG. 7A, not only the portion enclosed by the solid line, but a portion enclosed by a dotted line can be presented as the options. At this time, as shown in FIG. 7A, the PCs whose PC information is stored in the MFP does not necessarily have to be presented as the options in a different manner from the PCs whose PC information is stored in other MFPs, and can be presented in the same manner. Alternatively, for example, the PCs whose PC information is stored in the MFP and the PCs whose PC information is stored in other MFPs can be presented in different manners such as in a next screen. In this manner, too many options for the transmission destination may not be listed and thereby allowing an improvement in operability and preventing erroneous operation.

It is preferable that, at a stage of presentation, the MFP only receives information that specifies the PC information stored in other PCs from other MFPs, and presents the options based on the received information. Then, as shown enclosed by the dotted line in FIG. 7A, when one of the PCs whose PC information is stored in other MFPs is selected as the transfer destination, the MFP can request the PC information of the selected PC to the other MFP that stores the selected PC information. These ways of presentation of the options can be employed in the following examples in a similar manner.

By the presentation in the above manner, when the plurality of MFPs share and store the PC information for the PCs connected to the data transfer system, it is possible to provide convenience that a user can select the transfer destination from many options while taking an advantage of capability of reducing a storage capacity of each MFP.

Second Embodiment

Figure 10:
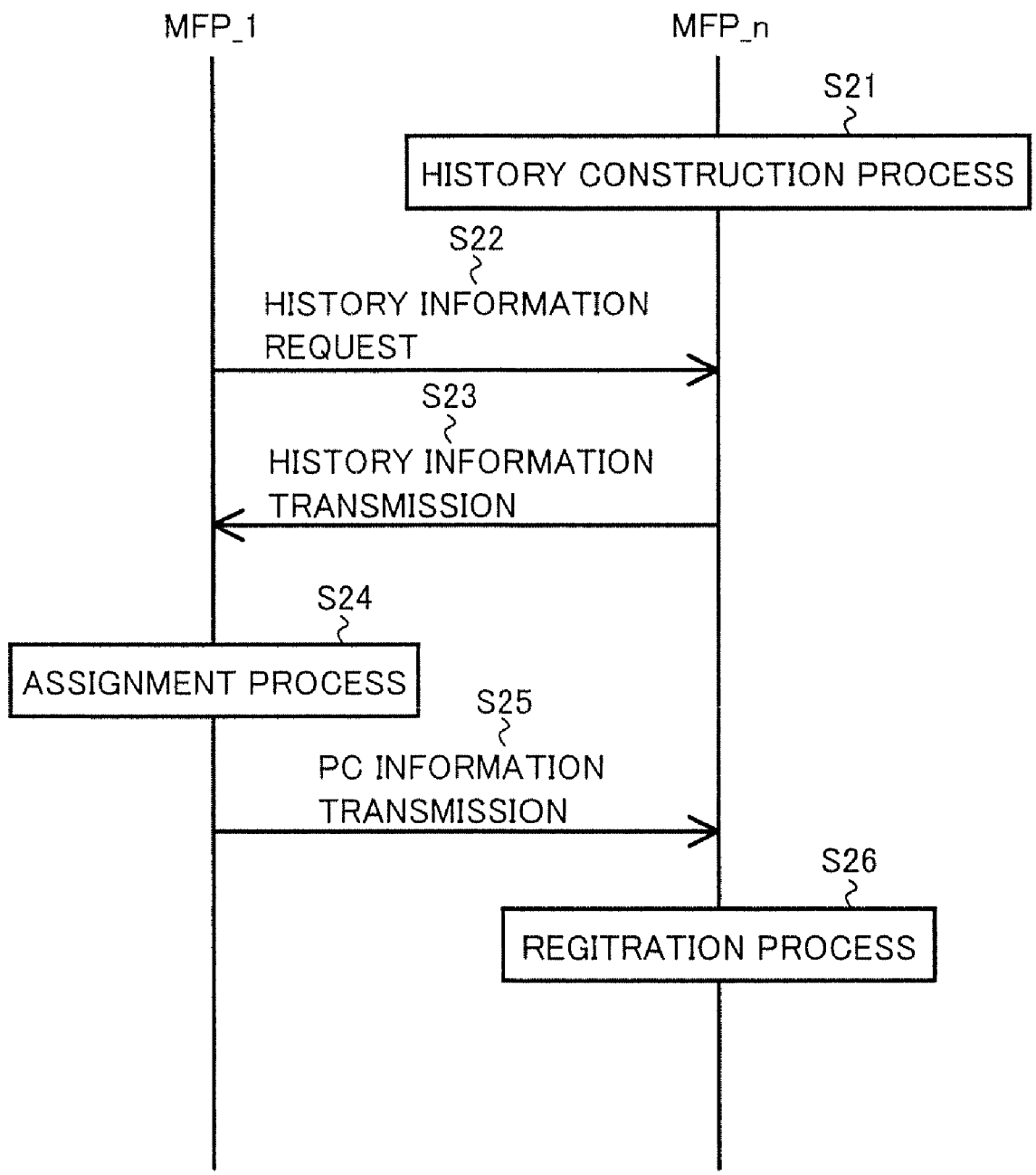
FIG. 10 is a diagram schematically illustrating a processing flow between the representing MFP and other MFPs in the data transfer system according to a second embodiment.

FIG. 10 is a diagram schematically illustrating a processing flow between the representing MFP and the MFPs other than the representing MFP in the data transfer system according to a second embodiment. In FIG. 10, the representing MFP is represented by MFP_1, and the MFPs other than the representing MFP are represented by MFP_n. MFP_n as the MFPs other than the representing MFP includes MFP_1 when functioning as the other MFP.

Referring to FIG. 10, in step S21, MFP_n as the MFPs other than the representing MFP carries out a history construction process, and constructs history information for the data transfer. As used herein, "history information" refers to an access count of each PC, which has transmitted an instruction for the data transfer, to the MFPs. Alternatively, "history information" can refer to, for each function used for the data transfer, an access count of the MFP to the function each PC, which has transmitted an instruction for the data transfer using the function. In other words, each MFP constructs the history, for each PC, of counts on how many times the MFP carried out the data transfer using itself or how many times the MFP carried out the data transfer using each function The history information is stored in a memory area, whose data stored therein is not deleted even when the power is shut down, such as nonvolatile storage 21 in each MFP, and updated every time an operation signal from the PCs is detected.

MFP_1 that is the representing MFP requests all the MFPs for the history information at a predetermined timing (step S22). In step S23, each MFP transmits the constructed history information to MFP_1. In step S24, MFP_1 that is the representing MFP carries out the assignment process based on the history information received from all MFP_n. With the process, the PCs that are connectable are assigned to each MFP included in the data transfer system. Then, in step S25, the PC information of the assigned PCs is transferred to each MFP_n. Upon reception of the result, in step S26, MFP_n carries out the registration process to register the assigned PCs as the PCs that are connectable to itself.

Figure 11:
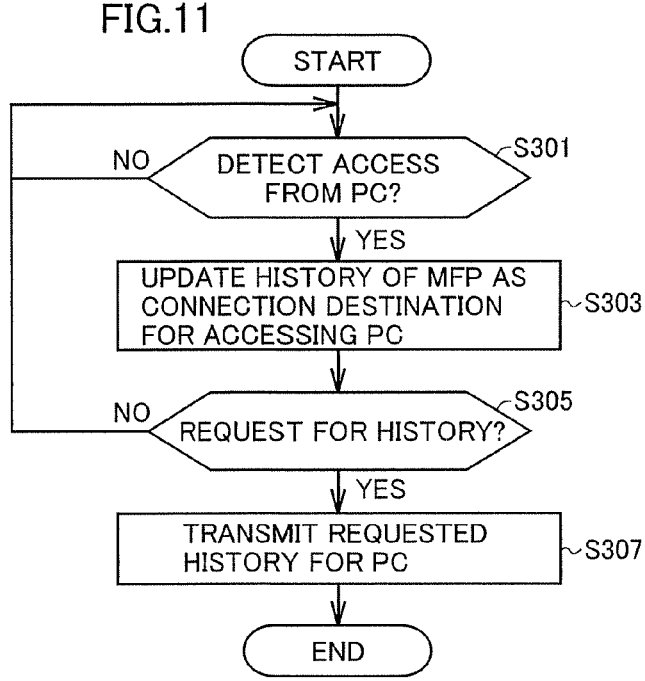
FIG. 11 is a flowchart illustrating a specific example of a process carried out by the MFPs other than the representing MFP according to the second embodiment.

FIG. 11 is a flowchart illustrating a specific example of the process carried out by MFP_n as the MFP other than the representing MFP. The process shown in the flowchart in FIG. 11 corresponds to the steps in steps S21 and S23 in FIG. 10, and is realized by CPU 30 of the MFP other than the representing MFP reading a program stored in ROM 11 and executing the program to control each unit shown in FIG. 2.

Referring to FIG. 11, when it is detected by communication unit 17 and the like in step S301 that PC 3 connected to the data transfer system has transmitted an operation signal for carrying out the data transfer to the MFP (YES in step S301), in step S303, file control unit 32 updates the history information for the PC that has transmitted the operation signal. Upon reception of a request for the history information from the representing MFP (YES in step S305), in step S307, file control unit 32 reads the history information for the PC of the request from nonvolatile storage 21, and transmits the read history information to the representing MFP (step S307).

Figure 12:
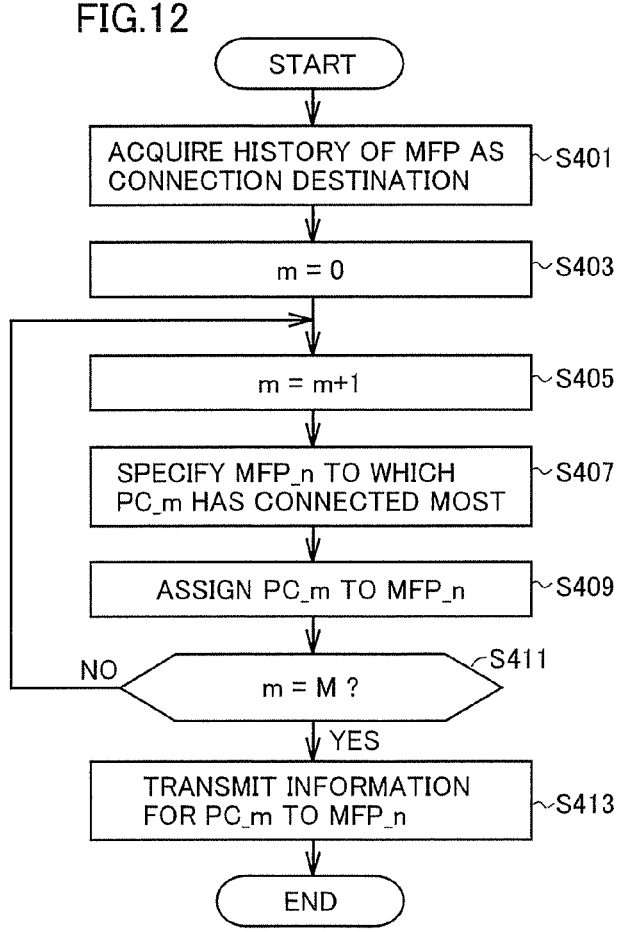
FIG. 12 is a flowchart illustrating a specific example of a process carried out by the representing MFP according to the second embodiment.

FIG. 12 is a flowchart illustrating a specific example of a process carried out by the representing MFP as MFP 1. The process shown in the flowchart in FIG. 12 corresponds to the steps in steps S24 and S25 in FIG. 10, and is realized by CPU 30 of the representing reading a program stored in ROM 11 and executing the program to control each unit shown in FIG. 2.

Referring to FIG. 12, in step S401, upon reception of the history that has been transmitted from each MFP other than the representing MFP in step S307, file control unit 32 initializes the variable number m in step S403, and increments the variable number m by one in step S405. The variable number m corresponds to each PC connected to the data transfer system.

In step S407, file control unit 32 compares the history information for the PC that corresponds to the variable number m acquired from all the MFPs, and specifies the MFP that the PC used most frequently to instruct the data transfer, that is, most frequently connected to, among the MFPs that acquire the history information. In step S409, file control unit 32 assigns the PC that corresponds to the variable number m to the specified MFP. The steps in steps S407 and S409 described above are repeated until the variable number m reaches the maximum number M of the PCs that are connected to the data transfer system, that is, the process is carried out for all the PCs that are connected to the data transfer system. When the process for the PCs that correspond to the variable number m is completed (YES in step S411), in step S413, file control unit 32 stores the result of the assignment in nonvolatile storage device 21, and transmits the PC information for the PCs assigned to each MFP.

It should be noted that, in the above example, the MFP that has most frequently connected to the PC is specified in step S407 and the PC is assigned to the specified MFP. However, a single PC can be assigned to the plurality of MFPs, or the MFPs are specified in an order of the frequency of the connection and the PC can be assigned to a predetermined number of the MFPs in the specified order. Moreover, when the PCs of the number more than the maximum number of PCs connectable to the MFP are connected to the data transfer system, file control unit 32 of the representing MFP can further compare the history information of all the PCs that are connected, and assign the PCs to the MFPs in a descending order of count until the number of the connected PCs reaches the maximum number of PCs that can be connected.

By carrying out the above assignment process to the MFPs according to the second embodiment and assigning the PC information to each MFP, the MFP to which the PC most frequently connects stores the PC information for the PC. Accordingly, the MFP that is most frequently used when the PC transmits an instruction signal for the data transfer using the MFPs is connectable, thus allowing an improvement in user's convenience.

In the above example, too, information for specifying the connectable PC as information relating to the connectable PC is assigned to the MFP that is connected to the data transfer system. However, similarly to the modified example of the first embodiment, the functions of the PCs that are used when transferring to the PC can be assigned to the MFPs connected to the data transfer system. That is, when it is detected, in step S301 described above, that the operation signal for carrying out the data transfer has been transmitted to the MFP from PC 3, the history information for the PC is updated for the function, which is instructed by the operation signal and to be used for transfer In step S407 described above, file control unit 32 of the representing MFP compares the history information acquired from all the MFPs, and specifies the MFP and the function of the MFP that are most frequently used when the PC instructs the data transfer, that is, the MFP that is most frequently connected to and its function, and, in step S409, assigns a use of the function of the PC to the MFP.

Figure 15:
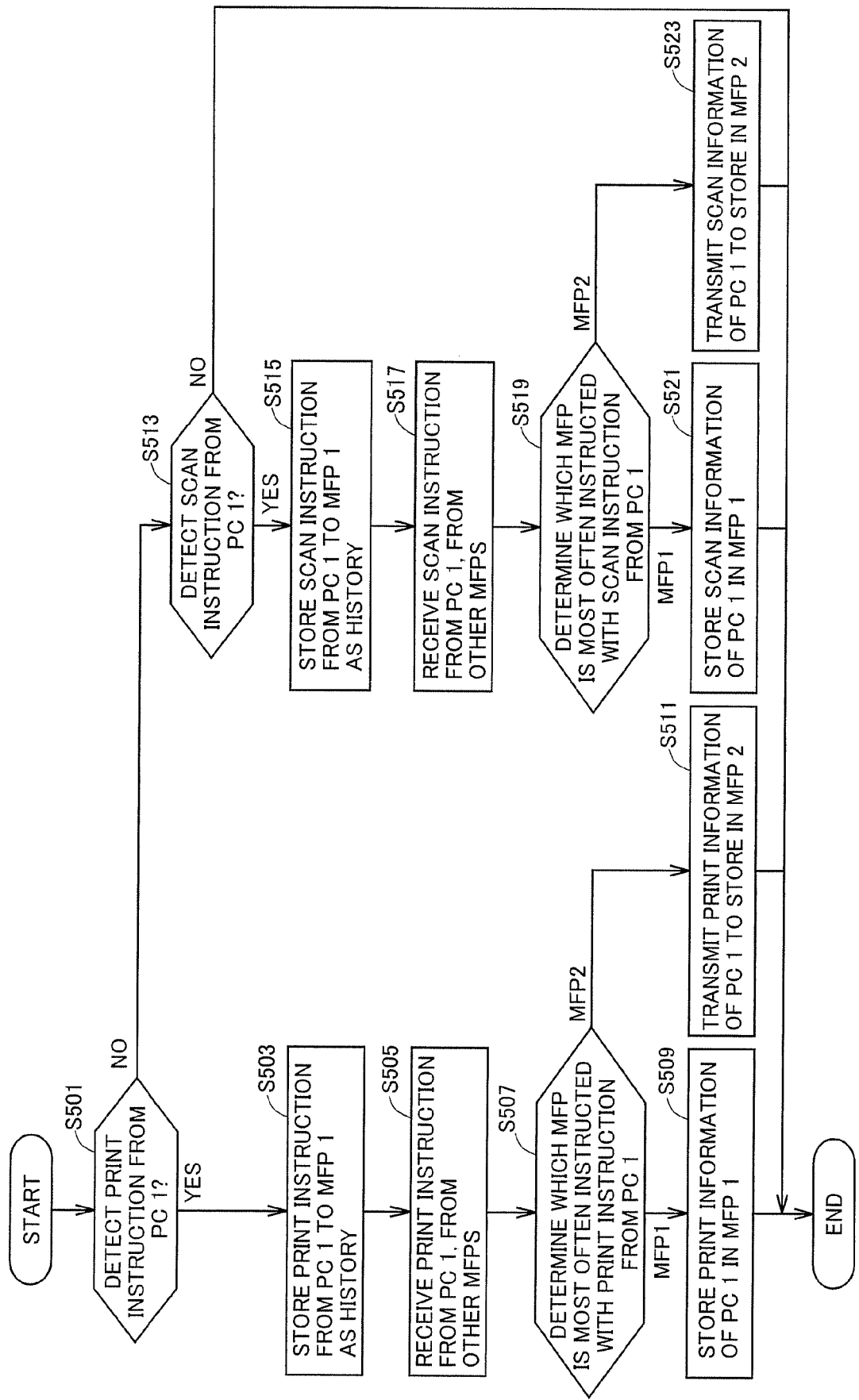
FIG. 15 is a flowchart illustrating a specific example of a process of assigning PC information carried out by a representing MFP according to a modified example of the second embodiment.

The following specifically describes the assignment process carried out by MFP 1 as the representing MFP with reference to FIG. 15, when MFP 1 and MFP 2 are connected to the data transfer system, and MFP 1 is the representing MFP and provided with the print function and the scan function as the functions for the data transfer.

Referring to FIG. 15, when it is detected by communication unit 17 and the like of MFP 1 that PC 1 connected to the data transfer system has transmitted the operation signal for the data transfer using the print function (YES in step S501), in step S503, file control unit 32 updates and stores the history information with which the data transfer is carried out using the print function for PC 1. Further, in step S505, file control unit 32 requests MFP 2 as the MFPs other than the representing MFP for the history information with which the data transfer is carried out using the print function for PC 1, and receives the history information from MFP 2.

In step S507, file control unit 32 determines, using the history information at MFP 1 and the history information from MFP 2, which MFP, out of MFP 1 and MFP 2, PC 1 has had more frequently carry out the data transfer using the print function. If, as a result, it is determined that MFP 1 is more frequent ("MFP 1" in step S507), in step S509, file control unit 32 carries out a process for registering the PC information for PC 1. On the other hand, if, as a result of step S507, it is determined that MFP 2 is more frequent ("MFP 2" in step S507), in step S511, file control unit 32 transmits the PC information for PC 1 to MFP 2 so that the PC information for PC 1 is registered to MFP 2.

Likewise, when it is detected by communication unit 17 and the like of MFP 1 that PC 1 connected to the data transfer system has transmitted the operation signal for the data transfer using the scan function (NO in step S501, and YES in S513), in step S515, file control unit 32 updates and stores the history information with which the data transfer is carried out using the scan function for PC 1. Further, in step S517, file control unit 32 requests MFP 2 as the MFPs other than the representing MFP for the history information with which the data transfer is carried out using the scan function for PC 1, and receives the history information from MFP 2.

In step S519, file control unit 32 determines, using the history information at MFP 1 and the history information from MFP 2, which MFP, out of MFP 1 and MFP 2, PC 1 has had more frequently carry out the data transfer using the scan function. If, as a result, it is determined that MFP 1 is more frequent ("MFP 1" in step S519), in step S521, file control unit 32 carries out a process for registering the PC information for PC 1. On the other hand, if, as a result of step S519, it is determined that MFP 2 is more frequent ("MFP 2" in step S519), in step S523, file control unit 32 transmits the PC information for PC 1 to MFP 2 so that the PC information for PC 1 is registered to MFP 2.

In the above described example shown in FIG. 15, the functions for carrying out the data transfer are limited to the print function and the scan function, and when the instruction is not using either function (NO in step S501 and NO in S513), the process is terminated. However, as described above, the functions for the data transfer can include other functions such as the facsimile function and the mail function. Accordingly, when these functions are also provided, MFP 1 further carries out similar steps as in steps S503 to S511 or steps S515 to S523 for each function, and the PC information to be registered is assigned to the MFP considering the function. Moreover, while, in the example shown in FIG. 15, only MFP 1 and MFP 2 are included in the data transfer system, the same applies to a case in which the data transfer system includes the MFPs more than that. In this case, in steps S505 and S517 described above, file control unit 32 of MFP 1 requests all of the MFPs for the history information with which the data transfer is carried out using the corresponding function for PC 1, and acquires the history information from the relevant MFP. Then, in steps S507 and S519, file control unit 32 determines which MFP, out of the acquired MFPs, PC 1 has had more frequently carry out the data transfer using the corresponding function.

By carrying out the above assignment process of the functions used by the PC in the data transfer to the MFPs according to the second embodiment, the MFP to which the PC most frequently connects stores the PC information for the PC using the function. Accordingly, the function of the MFP that is most frequently used when the PC transmits an instruction signal for the data transfer using the MFPs is connectable, thus allowing an improvement in user's convenience.

Modified Example

The above described is the example in which, for each PC, the history information of the MFPs to which the PC has connected is accumulated, and the assignment of the PCs is carried out based on the history information. Similarly, it is possible to carry out the assignment for each user based on the history information, by accumulating the history information with which the data transfer has been carried out. Assumption is given that a user logs in when using an apparatus connected to the data transfer system. For example, user information as information relating to a user who is permitted to log in is stored in the representing MFP, a server that is not shown in FIG. 1 but included in the data transfer system, or the like. The user information can be called as login information for each user. FIG. 13 is a diagram illustrating a specific example of the user information. Referring to FIG. 13, the user information includes at least information for identifying the user (ID) and information for verification (such as a password). Further, as shown in FIG. 13, permission/prohibition for the use of each function provided for the MFP can be included. Moreover, information indicating more detailed ranges of accessibility for each function can be included.

In the first modified example, PC 3 is previously assigned for each user, and the correspondence between the user and PC 3 is previously stored in, for example, the representing MFP, the server that is not shown in FIG. 1 but included in the data transfer system, and the like.

In the first modified example, MFP 1 stores the access count to the MFP as "history information" for each user who has logged in to MFP 1 or to PC 3 and has PC 3 transmit the operation signal to MFP 1 and for each user who has made the instruction for the data transfer. Further, for each function used for the data transfer and for each user who has made the instruction for the data transfer using the corresponding function, the access count to the function of the MFP can be stored. By acquiring the history information for each user accumulated in this manner by the representing MFP in the same process flow as described referring to FIG. 10, the representing MFP compares the history information for each user acquired from the MFPs, and specifies the MFP that has been most frequently used when the user instructs the data transfer. Thus, in the first modified example, PC 3 that corresponds to the user is assigned to the specified MFP. Alternatively, PC 3 that corresponds to the user and the function used for the data transfer are assigned to the specified MFP.

In the second modified example, users are previously assigned to each MFP, and the users assigned to each MFP are previously stored in, for example, the representing MFP, the server that is not shown in FIG. 1 but included in the data transfer system, and the like.

In the second modified example, MFP 1 stores the count to the PCs as the destination of the data transfer for each user who has logged in to MFP 1 or to PC 3 and has PC 3 transmit the operation signal to MFP 1. Further, the count can be stored for each function used for the data transfer. Specifically, each MFP constructs the history of the count for each user on how much data transfer is carried out to which PC or on which function is used to carry out the data transfer to which PC. By acquiring the history information for each user accumulated in this manner by the representing MFP in the same process flow as described referring to FIG. 10, the representing MFP compares the history information for each user acquired from the MFPs, and specifies the PC as the destination to which the user has most transferred data. Thus, in the second modified example, the PC as the destination to which the user has most transferred data is assigned to the MFP that is made correspondent to the user. Alternatively, as shown in FIGS. 14A to 14C, the PC as the destination to which the user has most transferred data and the function that is most used is assigned to the MFP that is made correspondent to the user. FIG. 14A shows, as a specific example of the PC information stored in the MFP that is made correspondent to a user A, that PC 1 as the destination to which user A has most transferred data and the print function and the scan function used in the data transfer as the function of the PC are stored in the MFP, for example. FIG. 14B shows, as a specific example of the PC information stored in the MFP that is made correspondent to a user B, that PC_1 and PC_2 as the destinations to which user B has most transferred data and the mail function, the OCR function, and the facsimile function used in the data transfer as the function of the PC are stored in the MFP. FIG. 14C shows, as a specific example of the PC information stored in the MFP that is made correspondent to a user C, that PC_1 and PC_2 as the destinations to which user C has most transferred data and the scan function, the mail function, the OCR function, and the facsimile function used in the data transfer as the function of the PC are stored in the MFP. Further, the PCs can be assigned to each MFP by combining the first modified example and the second modified example. Moreover, the user information in the modified examples can include information identifying specific groups (such as departments and sections) in addition to information identifying individual users. For example, a user belonging to one department can log in to the data transfer system using a department ID as identification information of the department. In this case, it is also possible to assign the PCs using the history for each user information as the information for identifying a specific group.

By carrying out the above assignment process, each MFP stores the PC information that is made correspondent to the user who is likely to use the MFP for the data transfer. Further, the MFP that is made correspondent to the user stores the PC information with which the data transfer is likely carried out using the MFP. With this, it is possible to improve user's convenience. In addition, it is possible to prevent erroneous operation.

Moreover, while the PCs are assigned using the history in the second embodiment, it is possible to use the history to determine an order of the presentation of the options in operation for the data transfer. Specifically, when a predetermined number of PCs in a descending order from the PCs that have transferred most data are assigned to the MFP, and when the data transfer is carried out by the MFP, the PCs can be presented in this order as the options for the transfer destination. In this manner, the transfer destination to which the user likely transfers the data is ranked high, thereby further improving user's convenience. In addition, it is possible to prevent erroneous operation.

It is also possible to provide a program for having a computer execute the above assignment process carried out in the data transfer system or the representing MFP. Such a program can be provided as a program product by recording the program in a computer readable recording medium such as a flexible disk coming with a computer, a CD-ROM (Compact Disk-Read Only Memory), a ROM, a RAM, and a memory card. Alternatively, it is also possible to provide the program by recording the program in a recording medium such as a built-in hard disk within a computer. Moreover, the program can be provided through downloading of the program via the network.

The program according to the present invention can call required modules at predetermined array and timing out of program modules provided as a part of an operating system (OS) of the computer, and has the modules execute the processes. In this case, the program itself does not include the modules and the processes are executed working together with the OS. The program that does not include a module as described above can be included in the program according to the present invention.

The program according to the present invention can be provided by being contained as a part of a different program. In this case, too, the program itself does not include the modules included in the different program and the processes are executed working together with the different program. The program that is included in the different program as described above can be included in the program according to the present invention.

The provided program product is installed in a program storage unit such as a hard disk and executed. It should be noted that such a program product includes the program itself and a recording medium on which the program is recorded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus included in a data transfer system, the apparatus comprising:
    a storage unit for storing information relating to a plurality of client apparatuses, the information being necessary for the image forming apparatus to identify said client apparatus when data is transferred from said client apparatus;
    a detection unit for detecting client apparatuses that are connected to said data transfer system and other image forming apparatuses connected to said data transfer system;
    an assignment unit for (i) assigning connected image forming apparatuses to connected client apparatuses, prior to receiving instructions from said connected client apparatuses and (ii) sharing assignment information of the data transfer system with each of the connected image forming apparatuses; and
    a transmission unit for transmitting, upon receiving a request from another image forming apparatus, information relating to client apparatuses to which said image forming apparatus has been assigned.

2. The image forming apparatus according to claim 1, wherein
    said detection unit detects a change in a connection status to said data transfer system, and
    when said detection unit has detected the change in said connection status, said assignment unit reassigns the client apparatuses connected to said data transfer system after the change to the image forming apparatuses connected to said data transfer system after the change.

3. The image forming apparatus according to claim 1, further comprising:
    a usage history accumulating unit for accumulating usage history of the image forming apparatus for each of said client apparatuses; and
    an acquisition unit for acquiring said usage history for each of said client apparatuses from each of the image forming apparatuses, wherein
    said assignment unit analyzes said usage history and assigns said client apparatus to said image forming apparatus according to a use frequency out of the image forming apparatuses.

4. The image forming apparatus according to claim 3, wherein
    said acquisition unit further acquires, from the image forming apparatuses, usage history of a function of the client apparatuses, the function being used when carrying out the data transfer using the image forming apparatus as said usage history for each of said client apparatuses,
    said assignment unit assigns said client apparatus and the function of said client apparatus to the image forming apparatus according to the use frequency out of the image forming apparatuses, and
    said transmission unit transmits said information relating to the client apparatuses corresponding to the function of said client apparatus.

5. The image forming apparatus according to claim 3, wherein
    said usage history for each of said client apparatuses includes a number of operations for the data transfer to the image forming apparatus carried out by said client apparatus.

6. The image forming apparatus according to claim 1, further comprising:
    a usage history accumulating unit for accumulating usage history of the image forming apparatus for each login information to said data transfer system, the usage history including a number of operations for the data transfer to the image forming apparatus carried out by the client apparatus corresponding to the login information; and
    an acquisition unit for acquiring, from the image forming apparatuses, said usage history for each login information to said data transfer system, wherein
    said login information identifies a corresponding client apparatus, and
    said assignment unit analyzes said usage history and assigns the client apparatus corresponding to said login information to said image forming apparatus according to a use frequency out of the image forming apparatuses.

7. The image forming apparatus according to claim 6, wherein said acquisition unit further acquires, from the image forming apparatuses, as said usage history for each of said login information, usage history of a function of the client apparatus corresponding to the login information, the function being used when carrying out the data transfer using the image forming apparatus,
    said assignment unit assigns the client apparatus corresponding to said login information and the function of said client apparatus to said image forming apparatus according to the use frequency out of the image forming apparatuses, and
    said transmission unit transmits said information relating to the client apparatuses corresponding to the function of said client apparatus.

8. The image forming apparatus according to claim 1, further comprising:
    a usage history accumulating unit for accumulating usage history of the image forming apparatus for each login information to said data transfer system, the usage history including a number of times that the client apparatus is designated as a destination of the data transfer for each of said client apparatuses; and an acquisition unit for acquiring, from the image forming apparatuses, said usage history for each login information, wherein said login information corresponds to at least one image forming apparatus out of the image forming apparatuses, and said assignment unit analyzes said usage history and assigns the client apparatus to the image forming apparatus that corresponds to said login information out of the image forming apparatuses according to a frequency that the client apparatus is designated as the destination of said data transfer in said usage history for said login information.

9. The image forming apparatus according to claim 8, wherein said acquisition unit further acquires, as said usage history for each of said login information, usage history of a function of the client apparatus that is designated as the destination of the data transfer, the function being used when carrying out the data transfer using the image forming apparatus, said assignment unit assigns said client apparatus and the function of said client apparatus to the image forming apparatus that corresponds to said login information out of the image forming apparatuses according to the frequency that the client apparatus is designated as the destination of said data transfer in said usage history for said login information, and said transmission unit transmits said information relating to the client apparatuses corresponding to the function of said client apparatus.

10. An image forming apparatus included in a data transfer system, the apparatus comprising:

a reception unit for receiving an assignment result from one other image forming apparatus from a plurality of image forming apparatuses included in said data transfer system, wherein the assignment result (i) lists client apparatuses to which said image forming apparatus has been assigned and (ii) is based on a connection status of each image forming apparatuses and each client apparatus;

a transmission unit for transmitting a request to said one other image forming apparatus for information relating to said client apparatuses to which said image forming apparatus has been assigned, said information being necessary for transferring data to said client apparatuses from said image forming apparatus;

a storing unit for storing the information relating to said assigned client apparatuses upon receiving said information from the one other image forming apparatus; and a presentation unit for presenting options for a transfer destination to which data is transferred based on the information relating to the client apparatuses stored in said storing unit, wherein said presentation unit presents the options for said transfer destination based on the information relating to the client apparatuses that corresponds to said image forming apparatus and information relating to client apparatuses that correspond to said other image forming apparatus.

11. A data transfer system comprising:

a plurality of image forming apparatuses; and a client apparatus, wherein a first image forming apparatus included in said plurality of image forming apparatuses includes, a storage unit for storing information relating to said client apparatuses, the information being necessary for said first image forming apparatus to identify said client apparatus when data is transferred to said first image forming apparatus from said client apparatus, a detection unit for detecting a change in a connection status of said client apparatuses and said plurality of image forming apparatuses to said data transfer system, an assignment unit for (i) assigning connected image forming apparatuses to connected client apparatuses, prior to receiving instructions from said connected client apparatuses and (ii) sharing, when said detection unit has detected the change in said connection status, a change in assignment of said information relating to the client apparatuses connected to said data transfer system with each of the plurality of image forming apparatuses connected to said data transfer system, and a transmission unit for transmitting, upon receiving a request from another image forming apparatus information relating to the client apparatuses to which said another image forming apparatus has been assigned, and each of said plurality of image forming apparatuses includes:

an acquisition unit for acquiring, from said first image forming apparatus, said information relating to the client apparatuses that have been assigned to the image forming apparatus; and a storing unit for storing said information relating to the client apparatuses that have been assigned to the image forming apparatus.

12. An information management method carried out by an image forming apparatus included in a data transfer system, the method comprising the steps of:

detecting client apparatuses that are connected to said data transfer system and other image forming apparatuses that are connected to said data transfer system;

assigning connected image forming apparatuses to connected client apparatuses, prior to receiving instructions from said connected client apparatuses;

sharing assignment information of said data transfer system with each of the connected image forming apparatuses; and transmitting, upon receiving a request from another image forming apparatus, client apparatus information relating to which said another image forming apparatus has been assigned.

13. An information management method carried out by a plurality of image forming apparatuses including a first image forming apparatus in a data transfer system, said data transfer system including client apparatuses, the method comprising the steps of:

detecting, by said first image forming apparatus, a change in a connection status of said client apparatuses and said plurality of image forming apparatuses to said data transfer system;

assigning, by said first image forming apparatuses, connected image forming apparatuses to connected client apparatuses, prior to receiving instructions from said connected client apparatuses;

sharing, by said first image forming apparatus, when the change in said connection status has been detected, a change in assignment relating to the client apparatuses connected to said data transfer system among the image forming apparatuses connected to said data transfer system;

upon receiving a request from other image forming apparatuses, transmitting, by said first image forming apparatus, to each said other image forming apparatus, respective client apparatus information relating to which said other image forming apparatuses have been assigned;

receiving, at each requesting image forming apparatus, from said first image forming apparatus, the respective client apparatus information relating to which said respective other image forming apparatuses have been assigned; and storing, at each image forming apparatus, said information relating to the client apparatuses that have been respectively assigned to said other image forming apparatuses.

\* \* \* \* \*